PDF: US008840713B2

(12) United States Patent
Suominen

(10) Patent No.: US 8,840,713 B2
(45) Date of Patent: Sep. 23, 2014

(54) SCRUBBER UNIT ARRANGEMENT

(75) Inventor: Ari Suominen, Vaasa (FI)

(73) Assignee: Wartsila Finland Oy, Vaasa (FI)

( * ) Notice: Subject to any disclaimer, the term of this patent is extended or adjusted under 35 U.S.C. 154(b) by 153 days.

(21) Appl. No.: 13/508,901

(22) PCT Filed: Nov. 5, 2010

(86) PCT No.: PCT/FI2010/050892
§ 371 (c)(1),
(2), (4) Date: Jul. 2, 2012

(87) PCT Pub. No.: WO2011/073503
PCT Pub. Date: Jun. 23, 2011

(65) Prior Publication Data
US 2012/0260800 A1    Oct. 18, 2012

(30) Foreign Application Priority Data
Dec. 15, 2009    (FI) .................................. 20096324

(51) Int. Cl.
*B01D 53/14*    (2006.01)
*B01D 53/50*    (2006.01)

(52) U.S. Cl.
CPC ...... *B01D 53/1481* (2013.01); *B01D 2258/012* (2013.01); *B01D 2257/302* (2013.01); *B01D 53/501* (2013.01); *B01D 2257/404* (2013.01)
USPC .................. 96/234; 96/235; 96/270; 96/271; 96/273; 96/322

(58) Field of Classification Search
CPC combination set(s) only.
See application file for complete search history.

(56) References Cited

U.S. PATENT DOCUMENTS

| 4,152,123 | A | | 5/1979 | Hegemann et al. |
| 4,804,523 | A | * | 2/1989 | Abrams et al. ............ 423/243.08 |
| 2003/0222457 | A1 | * | 12/2003 | Satou et al. ........................ 290/2 |
| 2005/0098036 | A1 | * | 5/2005 | Cadours et al. .................. 95/172 |
| 2008/0134891 | A1 | * | 6/2008 | Jarvenpaa ........................ 95/205 |
| 2009/0016153 | A1 | * | 1/2009 | Morgenthaler ............. 366/155.1 |

FOREIGN PATENT DOCUMENTS

| CH | 142332 A | 9/1930 |
| CH | 142332 A | 11/1930 |
| CN | 101314106 A | 12/2008 |
| CN | 101557868 A | 10/2009 |
| FI | 118576 B | 12/2007 |
| FI | 120213 B | 7/2009 |
| WO | WO 03062608 A1 | 7/2003 |
| WO | WO 2008077862 A1 | 7/2008 |

OTHER PUBLICATIONS

Chinese Office Action for Chinese Application No. 2010056827.4 dated Dec. 24, 2013 with English translation.

* cited by examiner

*Primary Examiner* — Duane Smith
*Assistant Examiner* — Cabrena Holecek
(74) *Attorney, Agent, or Firm* — Muncy, Geissler, Olds & Lowe, P.C.

(57) ABSTRACT

The invention relates to a scrubber unit arrangement for cleaning exhaust gas. The arrangement comprises a scrubber unit for receiving a flow of exhaust gas, a pump means for supplying a scrubbing medium to the scrubber unit from a source of scrubbing medium, and means for discharging scrubbing medium from the scrubber unit. In order to provide an energy efficient scrubbing process, the scrubber unit arrangement further comprises a turbine unit, which is arranged to receive discharged scrubbing medium from the scrubber unit. Scrubbed exhaust gas is separately discharged from the scrubber unit.

12 Claims, 5 Drawing Sheets

SCRUBBER UNIT ARRANGEMENT

TECHNICAL FIELD

Figure 1:
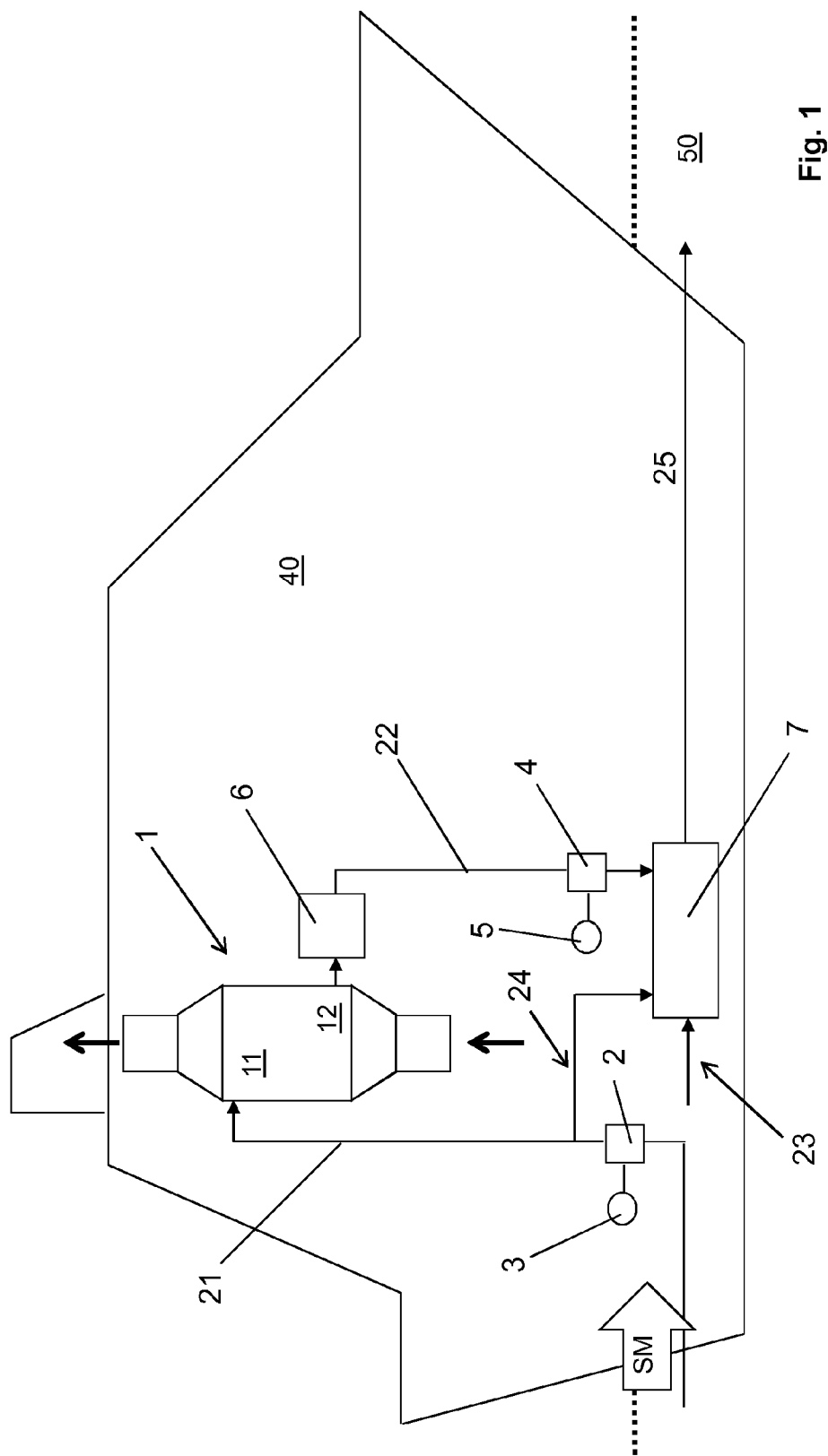

The invention relates to a scrubber unit arrangement for cleaning exhaust gas, which arrangement comprises a scrubber unit for receiving a flow of exhaust gas, a pump means for providing a scrubbing medium to the scrubber unit from a source of scrubbing medium, and means for discharging scrubbing medium from the scrubber unit.

BACKGROUND ART

Machinery arrangements for marine vessels conventionally comprise one or more combustion units, such as diesel engines, oil-fired boilers, incinerators, etc. The combustion units usually have independent exhaust gas duct assemblies, whereby also the cleaning of exhaust gases takes place separately for each combustion unit.

Gases coming from oil-fired boilers are sometimes referred to as flue gases. Gases from diesel engines are mostly called exhaust gases. In the following the general term exhaust gas will be used with regard to gases from all relevant types of combustion units.

Reduction of exhaust gas emissions can be obtained by improving the performance of the combustion units, by using cleaner fuel, or by cleaning the exhaust gases.

In previously known solutions, with regard to cleaning exhaust gases, machinery arrangements have been provided with exhaust gas cleaning systems for nitric oxides ($NO_x$).

Presently, however, due to increasing demands to reduce exhaust gas emissions, especially in port conditions and near the coast, there will be a need to clean sulphuric oxides ($SO_x$) emanating from sulphur rich fuels, such as conventional heavy fuel oil.

Normally exhaust gas is led into an exhaust gas cleaning system, i.e. a scrubber unit in which a scrubbing medium, such as an alkaline washing solution, is sprayed into the exhaust gas, whereby the alkaline components react with acidic components of the exhaust gas. The scrubbing medium is usually supplied from a so-called process tank. The scrubbing medium absorbs $SO_x$, other components, as well as heat from the exhaust gas flow.

Scrubber units are normally very large and have a considerable height. Furthermore, they are usually installed as more or less a last component at the end of an exhaust gas duct system. In marine vessels exhaust gas is usually led vertically out from the stack, whereby a scrubber unit has to be placed very high up in the structures of the marine vessel.

Sea water scrubbers have been used for sulphur removal in stationary applications and are now considered also for marine vessels.

Sea water scrubbers utilise the natural alkalinity of sea water to keep the pH at a sufficiently high level for $SO_x$ removal. Since alkalinity is limited, big relative flow volume flows are needed in order to achieve an efficient scrubbing process. This results in high energy consumption with due to large amounts of water that have to be pumped upwards to a considerable height, particularly when sea water is used as a scrubbing medium on a marine vessel.

SUMMARY OF INVENTION

An object of the invention is to avoid the above mentioned problems and to provide a scrubber unit providing an effective exhaust gas emission control in an efficient manner. This object is attained by a scrubber unit and a method for cleaning exhaust gas in scrubber unit.

The basic idea of the invention is to utilise the hydrostatic energy of a discharge flow of scrubbing medium from a scrubber unit for achieving an efficient and economical exhaust gas cleaning process, i.e. scrubbing process. In order to obtain this, the scrubber unit arrangement further comprises a turbine unit which is arranged to receive discharged scrubbing medium from the scrubber unit, whereby scrubbed exhaust gas is arranged to be separately discharged from the scrubber unit.

Advantageously the pump means is arranged independently of the turbine unit, whereby the pump means is provided with an electric motor and the turbine unit is provided with a generator. In this way, the electric power produced by the generator run by the turbine unit can be distributed through an electric network e.g. for driving the electric motor of the pump means or for other purposes, such as hotel load on a marine vessel.

Alternatively, the pump means and the turbine unit can be mechanically connected to each other. In this way the turbine unit can directly drive the pump means. Additionally, it is advantageous that the pump means is provided with an electric motor, which can be used to drive the pump means, if the drive power provided by the turbine unit is not sufficient. Alternatively, a combined electric motor and generator can be connected to the pump means. This allows for producing surplus electric energy in the case the turbine unit provides more power than is required by the pump means.

The turbine unit can thus be arranged to provide driving power for the pump means and/or surplus electric power for other consumers, e.g. such as hotel load on the marine vessel.

Advantageously, the arrangement comprises a treatment unit for treating, particularly for removing impurities from the scrubbing medium discharged from the scrubber unit. The treatment unit is thus arranged downstream of the scrubber unit in a flow direction of the scrubbing medium. The treatment unit can be located either upstream of the turbine unit in the flow direction of the scrubbing medium or downstream of the turbine unit in the flow direction of the scrubbing medium depending on the configuration of the scrubbing unit arrangement.

Preferably the arrangement further comprises a dilution unit for pH control of the scrubbing medium discharged from the scrubber unit before it is discharged to the surroundings. This is particularly advantageous in connection with marine vessels, on which sea water is used as the scrubbing medium and from which the used scrubbing medium is discharged into a surrounding sea.

For dilution purposes, the arrangement is advantageously provided with means for supplying a dilution medium to the dilution unit. Such means can be provided in various forms depending on the circumstances.

The present invention is particularly advantageous when the scrubbing medium is sea water. Further advantages are available when the present invention is deployed on a marine vessel using sea water as the scrubbing medium.

Advantageous features of the present invention are described in further detail below.

BRIEF DESCRIPTION DRAWINGS

Figure 2:
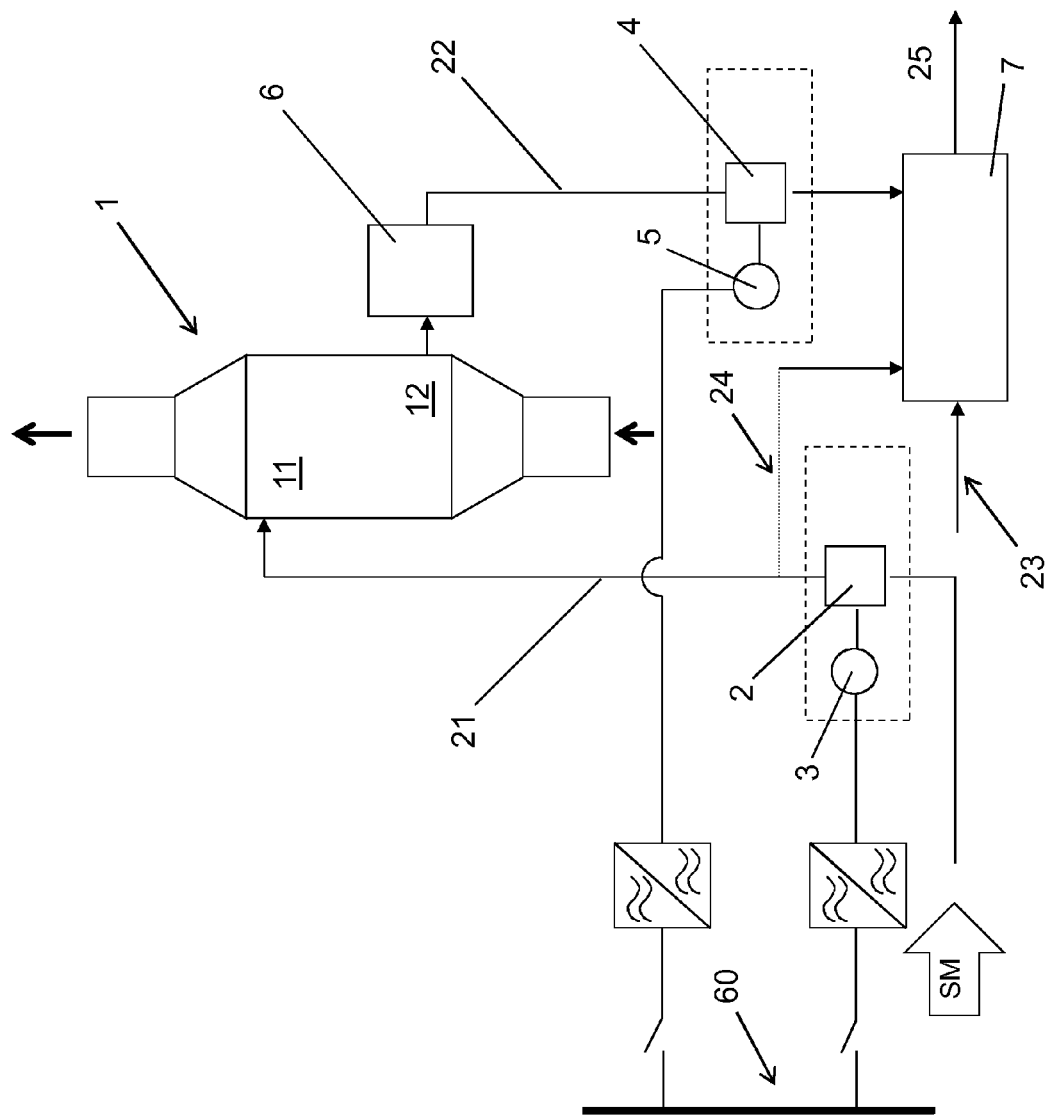
Figure 3:
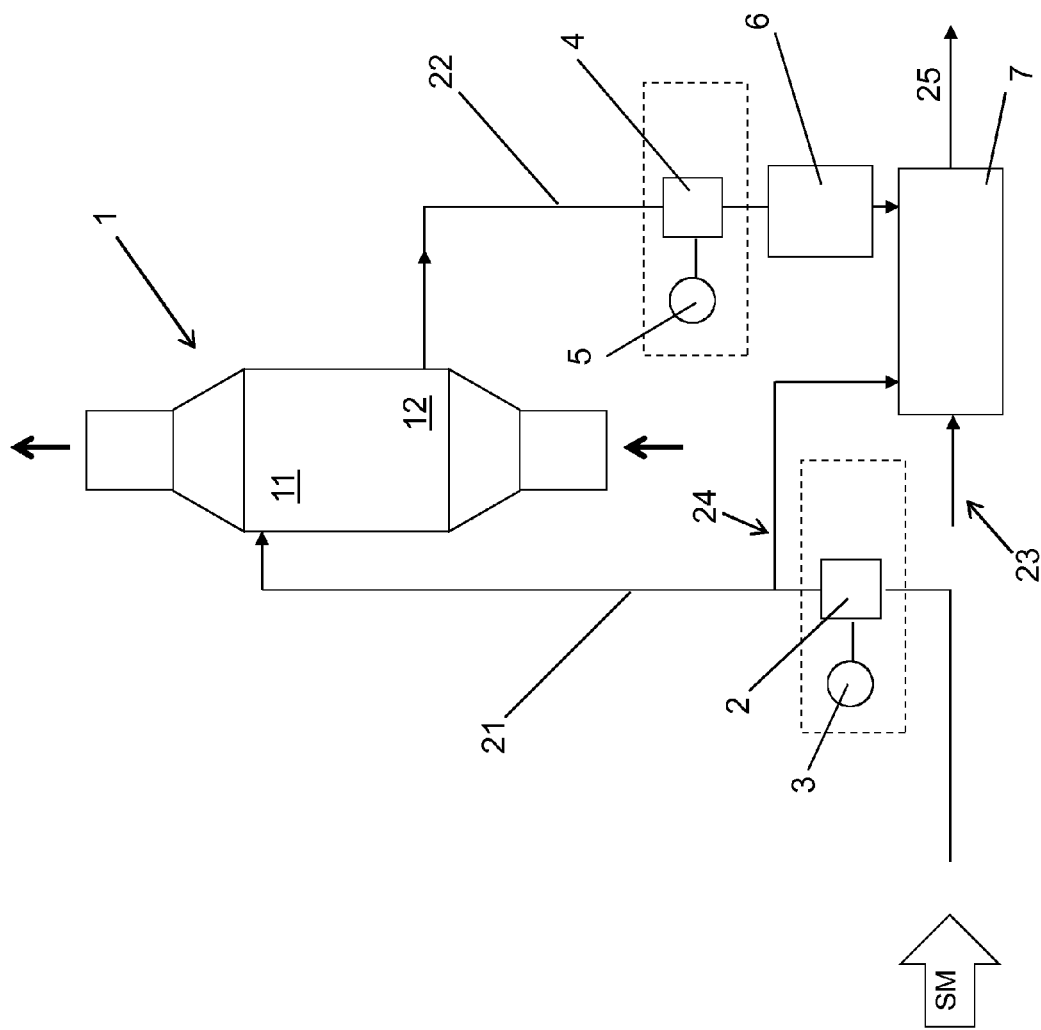
Figure 4:
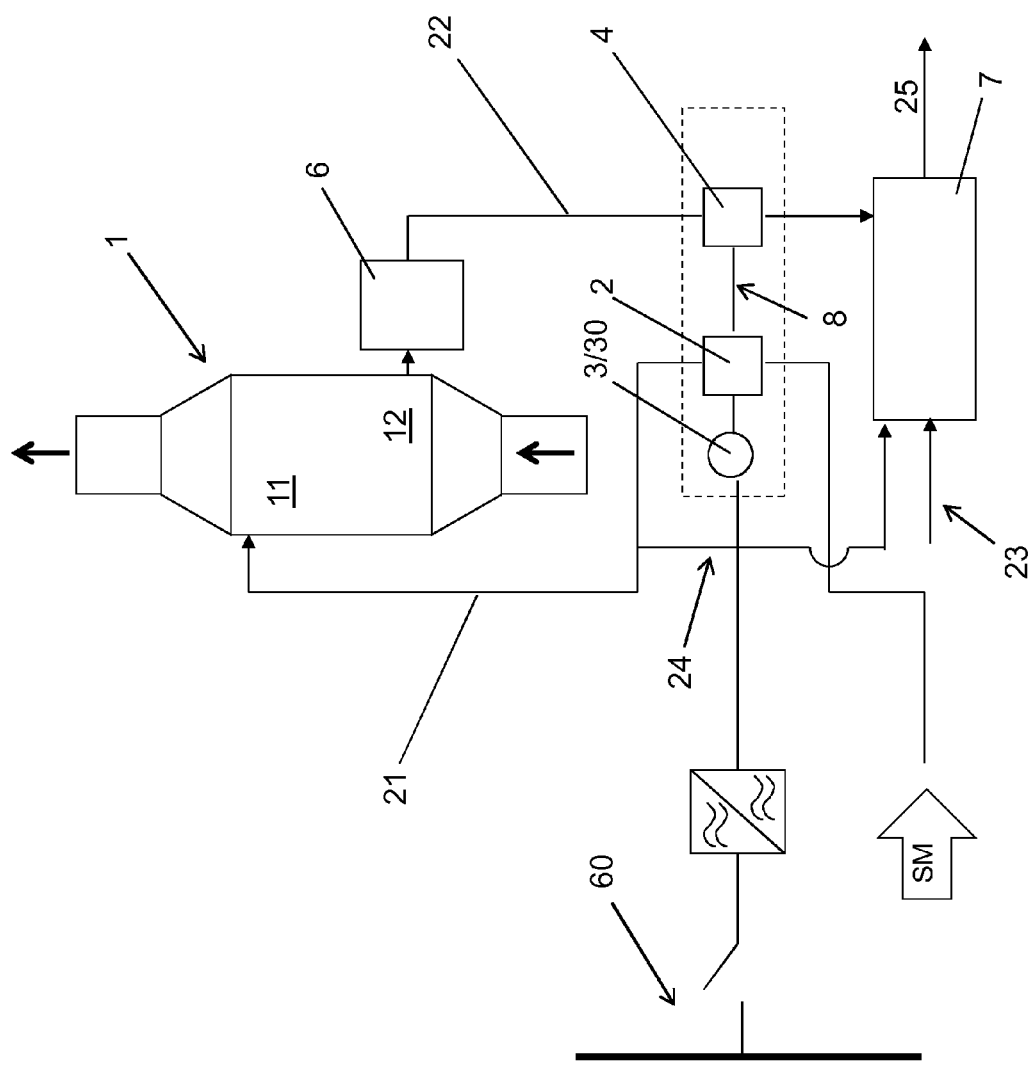
Figure 5:
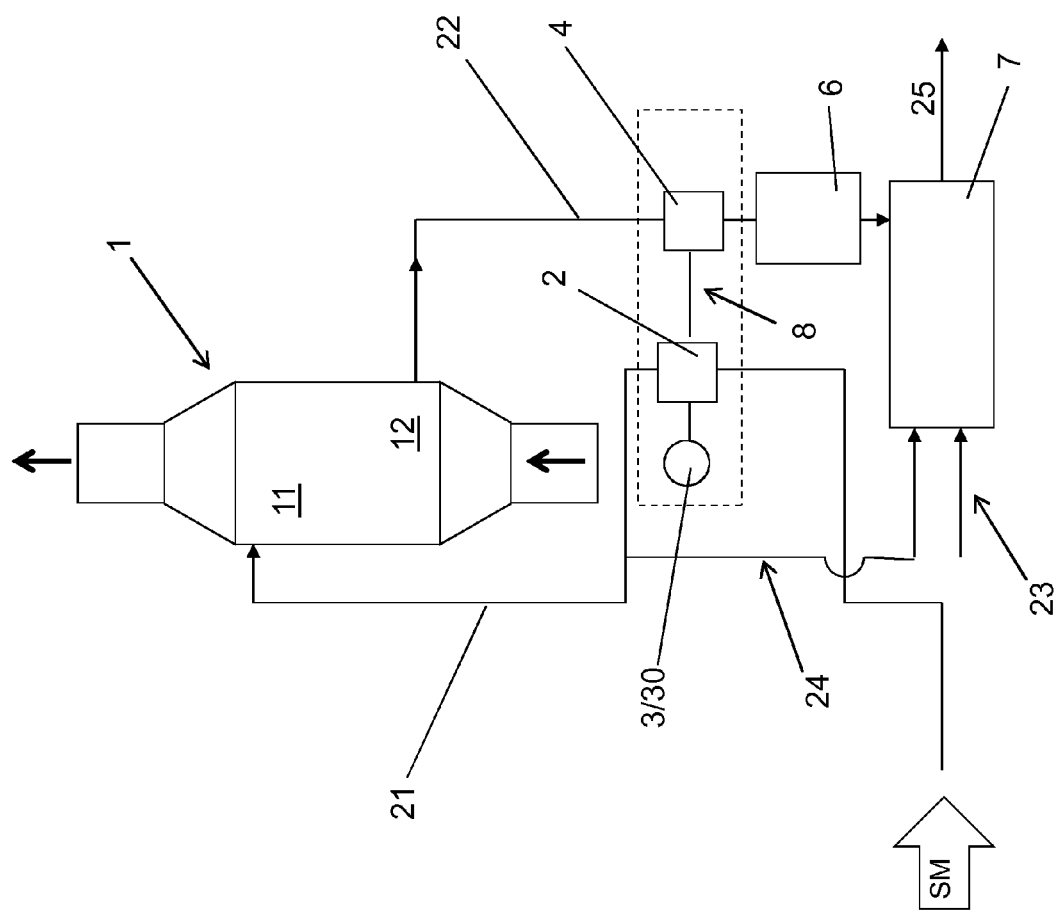

In the following the invention will be described, by way of example only, with reference to the accompanying schematic drawings, in which FIG. 1 illustrates an advantageous general layout for deploying the present invention, FIG. 2 illustrates a first embodiment of the present invention, FIG. 3 illustrates a second embodiment of the present invention, FIG. 4 illustrates a third embodiment of the present invention, and FIG. 5 illustrates a fourth embodiment of the present invention.

DETAILED DESCRIPTION

FIG. 1 illustrates a marine vessel 40 which is arranged to be operated in a surrounding sea 50. The present invention is advantageously deployed on such a marine vessel 40.

The scrubber unit arrangement of the present invention comprises a scrubber unit 1 and a pump means 2 for supplying a scrubbing medium, in this case sea water, through a supply pipe 21 to the scrubber unit 1 from a source SM (indicated by a horizontal block arrow directed towards the supply pipe 21) of scrubbing medium. Said source is the surrounding sea 50. The scrubber unit 1 is intended for receiving and subsequently scrubbing a flow of exhaust gas from a combustion unit (not shown) on the marine vessel 40.

The fluid scrubbing medium, i.e. sea water, is thus led to the scrubber unit 1, whereby it contacts and reacts with the flow of exhaust gas which has been led to the scrubber unit 1 for scrubbing purposes. Used scrubbing medium discharged from the scrubber unit 1 is arranged to be led to a turbine unit 4 by way of a discharge pipe 22. The flow of scrubbing medium is used to drive the turbine unit 4 thereby capturing the hydrostatic energy of the downwards flowing discharged scrubbing medium. The scrubbed flow of exhaust gas is separately discharged from the scrubber unit 1 (flow of exhaust gas indicated by block arrows).

Before the turbine unit 4, discharged scrubbing medium is lead to a treatment unit 6 particularly for removal of impurities. After the turbine unit 4, the discharged and used scrubbing medium is led, if necessary in view of environmental requirements, to a dilution unit 7 before being discharged into the surrounding sea 50 through an outlet pipe 25.

In some situations treatment in the treatment unit 6 and/or dilution in the dilution unit 7 may not be needed, e.g. due to high scrubbing medium flow.

The scrubber unit arrangement illustrated in FIG. 1 basically corresponds to the present invention as described in FIG. 2 below. However, it is clear that all embodiments described in FIG. 2 to FIG. 5 below can equally be deployed on such a marine vessel 40.

The flow direction of scrubbing medium is indicated by arrow lines and the flow direction of exhaust gas is indicated by vertical block arrows.

In the following various embodiments of the present invention will be discussed in detail in the following.

FIG. 2 illustrates a first embodiment of the present invention relating to a scrubber unit arrangement for carrying out a scrubbing process. The scrubber unit arrangement comprises a scrubber unit 1 and a pump means 2 for supplying a scrubbing medium through a supply pipe 21 to the scrubber unit 1 from a source SM (indicated by a horizontal block arrow SM directed towards the supply pipe 21) of scrubbing medium. The scrubber unit 1 is intended for receiving and subsequently scrubbing a flow of exhaust gas (indicated by lower vertical block arrow) from a combustion unit (not shown). Used scrubbing medium discharged from the scrubber unit 1 is arranged to be led to a turbine unit 4 (discussed more in detail below) in order to capture the hydrostatic energy of the downwards flow of the fluid scrubbing medium. The scrubber unit arrangement includes means for discharging used scrubbing medium from the scrubber unit 1. These means include as a first component a discharge pipe 22.

The scrubbed exhaust gas is separately discharged from the scrubber unit 1 (Indicated by upper vertical block arrow).

The flow direction of scrubbing medium is indicated by arrow lines and the flow direction of exhaust gas is indicated by the above mentioned vertical block arrows.

The pump means 2 is provided with an electric motor 3 for driving the pump means 2. Scrubbing medium is pumped by the pump means 2 through the supply pipe 21 into an upper part 11 of the scrubber unit 1. After the scrubbing medium has interacted with exhaust gas in the scrubber unit 1, used scrubbing medium is discharged from a lower part 12 of the scrubber unit 1 through the discharge pipe 22. Scrubbed exhaust gas is discharged separately from the scrubber unit 1.

Discharged scrubbing medium is then led through the discharge pipe 22 to a treatment unit 6 and further from the treatment unit 6 to a turbine unit 4, which captures the hydrostatic energy of the fluid flow. A generator 5 is connected to the turbine unit 4.

In this embodiment the pump means 2 and the turbine unit 4 are arranged independently of each other (indicated by broken lines). The pump means 2 is arranged to be driven by the electric motor 3 and the turbine unit 4 is arranged to drive the generator 5. The turbine unit 4 can thus be arranged to provide driving power, in this case electric power, for the pump means 2.

After the turbine unit 4 discharged used scrubbing medium is led to a dilution unit 7, from which it is discharged through an outlet pipe 25 to the surroundings, a body of water, or other receiving means as appropriate (not shown). For dilution purposes and pH control purposes (discussed more in detail below) the dilution unit 7 can be provided with a dilution medium, e.g. clean (or unused) scrubbing medium. The dilution medium can be provided by various means to the dilution unit 7. It can be supplied e.g. from the surrounding sea as indicated by feed pipe 23, from the supply pipe 21 upstream of the pump means 2 as indicated by feed-back pipe 24, or from some other source as discussed more in detail below.

The present invention is particularly advantageous when deployed on a marine vessel 40 (FIG. 1) where sea water is used as a scrubbing medium. This will now be described, by way of example only.

Sea water, i.e. the scrubbing medium is pumped from the surrounding sea 50 (FIG. 1), in which the marine vessel 40 (FIG. 1) is operated, by the pump means 2 and is supplied through the supply pipe 21 to the scrubber unit 1 for washing exhaust gas (exhaust gas flow indicated by vertical arrows) from a combustion unit (not shown) on the marine vessel.

The scrubber unit 1 is usually installed more or less as a last component at the end of the exhaust gas duct arrangement on the marine vessel 40 (FIG. 1), which in practice means it is very high up in the structure of the marine vessel. This can be a height of about 10-50 meters. Exhaust gas from a combustion unit (not shown) is led to the scrubber unit 1 for scrubbing purposes.

After the sea water has been led through the scrubber unit 1, it is discharged through the discharge pipe 22 and through the treatment unit 6 into the turbine unit 4, in which the hydrostatic energy of the flow of discharged sea water is used to produce energy, in this case electric power by means of the generator 5 driven by the turbine unit 4. This electric power can then be distributed through an electric network 60 for driving the pump means 2 and/or e.g. as electric power for hotel load on board the marine vessel.

The scrubbed exhaust gas is separately discharged from the scrubber unit 1 (indicated by the upper block arrow).

If the turbine unit 4 provides more power than is required by the pump means 2, any surplus electric power can then be distributed through the electric network 60 e.g. for hotel load on board the marine vessel. The possibility that the turbine unit 4 would provide more power is due to the fact that water usually condenses from the exhaust gas in the scrubber unit 1. This may thus result in a larger flow of water discharged from the scrubber unit 1 than the flow of water that is pumped into the scrubber unit 1 for the scrubbing process.

Normally also auxiliary generator sets connected to such electric networks are provided on marine vessels in order to ensure redundancy with regard to available electric power.

The sea water discharged from the scrubber unit 1 is firstly treated in the treatment unit 6 in order to remove impurities from the used sea water. After the turbine unit 4, the discharged sea water is led to the dilution unit 7 mainly for pH control in order to guarantee that the discharged sea water meets prevailing environmental criteria.

On one hand, a sufficiently high pH is needed in the scrubber unit 1 in order to achieve the necessary sulphur ($SO_x$) scrubbing efficiency. This determines the amount of sea water that has to be pumped into the scrubber unit 1 for the scrubbing process. On the other hand, the environmental criteria applying to water discharged from a marine vessel into the surrounding sea set a stricter pH requirement for this discharged water. In practice this means that the scrubbing process can be carried out with less water, whereby it is sufficient to pump a smaller amount of sea water by the pump means 2 into the scrubbing unit 1.

In this way also the pumping energy requirement for the pump means 2 can be optimized as this provides a way to lessen the amount of required sea water for the actual scrubbing process taking place in the scrubber unit 1.

In order to guarantee compliance with said environmental criteria, the sea water discharged from the scrubber unit 1 and subsequently led from the treatment unit 6 into the dilution unit 7 advantageously is mixed e.g. with fresh sea water in the dilution unit 7 for dilution purposes. This fresh sea water can be provided from the surrounding sea as indicated by feed pipe 23 or from the supply pipe 22 upstream of the pump means 2 as indicated by feed-back pipe 24, as appropriate. A separate pump can naturally be used for this purpose. Alternatively dilution water can also be provided e.g. from a central cooler of the combustion unit or other machinery on board the marine vessel 40. Clearly, it is to be understood that, if the sea water discharged from the scrubber unit 1 as such fulfils the prevailing environmental criteria, further dilution may not be necessary.

The pumping of water into the dilution unit 7 requires relatively less energy, since the lifting height for pumping water to the dilution unit 7 is far lower than the lifting height for pumping water into the scrubber unit 1, which is located high up in the structure of the marine vessel 40. This further increases the energy efficiency of the scrubbing process.

The sea water thus treated, and diluted, if necessary and as discussed above, can then be discharged back into the surrounding sea 50 through the outlet pipe 25.

FIG. 3 illustrates a second embodiment of the present invention. This embodiment corresponds to the embodiment discussed above in FIG. 2. The difference with regard to the embodiment of FIG. 2 is that discharged scrubbing medium is firstly led to the turbine unit 4 and thereafter to the treatment unit 6. After the treatment unit 6 discharged scrubbing medium is led to the dilution unit 7. Although the electric network 60 (FIG. 2) is not shown, it is clear that it can be deployed in connection with this embodiment in a corresponding manner as described above.

It is also possible that treatment in the treatment unit 6 as discussed in connection with the embodiments of FIG. 2 and FIG. 3 above is not necessary, e.g. due to a high scrubbing medium flow which renders the discharged scrubbing medium compliant with prevailing environmental criteria.

FIG. 4 illustrates a third embodiment of the present invention relating to a scrubber unit arrangement for carrying out a scrubbing process. The scrubber unit arrangement comprises a scrubber unit 1 and a pump means 2 for supplying a scrubbing medium through a supply pipe 21 to the scrubber unit 1 from a source SM (indicated by a horizontal block arrow directed towards the supply pipe 21) of scrubbing medium. The scrubber unit 1 is intended for receiving and subsequently scrubbing a flow of exhaust gas (indicated by lower vertical block arrow) from a combustion unit (not shown). Used scrubbing medium discharged from the scrubber unit 1 is arranged to be led to a turbine unit 4 (discussed more in detail below) in order to capture the hydrostatic energy of the downwards flow of the fluid scrubbing medium. The scrubber unit arrangement includes means for discharging scrubbing medium from the scrubber unit 1. These means include as a first component a discharge pipe 22.

The scrubbed exhaust gas is separately discharged from the scrubber unit 1 (Indicated by the upper vertical block arrow).

The flow direction of scrubbing medium is indicated by arrow lines and the flow direction of exhaust gas is indicated by the above mentioned vertical block arrows.

In this embodiment, the pump means 2 and the turbine unit 4 are mechanically connected (indicated by broken lines) to each other. The mechanical connection, as indicated by reference numeral 8, can be arranged e.g. by means of a shaft. Advantageously such a connection, e.g. the shaft, is provided with a coupling, e.g. a clutch, a gear, or other corresponding mechanism, providing a possibility to detach the pump means 2 and the turbine unit 4 from each other with regard to different operating conditions.

This embodiment further shows that the pump means 2 is provided with an electric motor 3 for driving the pump means 2. However, as the pump means 2 and the turbine unit 4 are mechanically connected, a combined electric motor and generator 30 could be deployed instead of the electric motor 3. In such a case, e.g. if the turbine unit 4 provides more power than what is required for the pump means 2, the combined pump means and turbine unit arrangement can be used to generate additional electric energy for e.g. hotel load on board a marine vessel.

An alternative to the mechanical connection, a hydrostatic power transmission would also be possible.

The turbine unit 4 can thus be arranged to provide driving power for the pump means 2.

The possibility that the turbine unit 4 would provide more power is due to the fact that water usually condenses from the exhaust gas in the scrubber unit 1. This may thus result in a larger flow of water discharged from the scrubber unit 1 the flow of water pumped into the scrubber unit 1 for the scrubbing process.

Normally also auxiliary generator sets connected to such electric networks are provided on marine vessels in order to ensure redundancy with regard to available electric power.

Scrubbing medium is pumped by the pump means 2 through the supply pipe 21 into an upper part 11 of the scrubber unit 1. After the scrubbing medium has interacted with exhaust gas in the scrubber unit 1, used scrubbing medium is discharged from a lower part 12 of the scrubber unit 1 through the discharge pipe 22.

Scrubbed exhaust gas is discharged separately from the scrubber unit 1 (indicated by upper vertical block arrow).

Discharged scrubbing medium is then led through the discharge pipe 22 to a treatment unit 6 and further from the treatment unit 6 to the turbine unit 4. After the turbine unit 4 discharged scrubbing medium is led to a dilution unit 7, from which it is discharged through an outlet pipe 25 to the surroundings, a body of water, or other receiving means as appropriate (not shown). For dilution purposes and pH control purposes (discussed more in detail below) the dilution unit 7 can be provided with a dilution medium, e.g. clean or (unused scrubbing) medium. The dilution medium can be provided by various means to the dilution unit 7. It can be supplied e.g. from the surrounding sea as indicated by feed pipe 23, from the supply pipe 21 as indicated by feed-back pipe 24, or from some other source as discussed more in detail below.

The present invention is particularly advantageous when deployed on a marine vessel 40 (FIG. 1) where sea water is used as a scrubbing medium. This will now be described, by way of example only.

Sea water, i.e. the scrubbing medium is pumped from the surrounding sea 50 (FIG. 1), in which the marine vessel 40 (FIG. 1) is operated, by the pump means 2 and is supplied through the supply pipe 21 to the scrubber unit 1 for washing exhaust gas (exhaust gas flow indicated by vertical arrows) from a combustion unit (not shown) on the marine vessel.

The scrubber unit 1 is usually installed as more or less a last component at the end of the exhaust gas duct arrangement on the marine vessel 40 (FIG. 1), which in practice means it is very high up in the structure of the marine vessel. This can be a height of about 10-50 meters. Exhaust gas from a combustion unit (not shown) is led to the scrubber unit 1 for scrubbing purposes.

After the sea water has been led through the scrubber unit 1, it is discharged through the discharge pipe 22 and through a treatment unit 6 into the turbine unit 4, in which the hydrostatic energy of the flow of discharged sea water is used to produce energy, in this case mechanically transferable drive power as the turbine unit 4 and the pump means 2 are mechanically connected. The turbine unit 4 can thus drive the pump means 2 directly. If sufficient drive power is not available from the turbine unit 4, the electric motor 3 can be used for driving the pump means 2.

On the other hand, a combined electric motor and generator 30 could be deployed instead of the electric motor 3. This would provide the possibility to produce surplus electric power, if the turbine unit 4 provides more power than is required by the pump means 2. Any surplus electric power can then be distributed through an electric network 60 e.g. for hotel load on board the marine vessel.

The scrubbed exhaust gas is separately discharged from the scrubber unit 1 (Indicated by the upper vertical block arrow).

The possibility that the turbine unit 4 would provide more power is due to the fact that water usually condenses from the exhaust gas in the scrubber unit 1. This may thus result in a larger flow of water discharged from the scrubber unit 1 than the flow of water pumped into the scrubber unit 1 for the scrubbing process.

The sea water discharged from the scrubber unit 1 is firstly treated in the treatment unit 6 in order to remove impurities from the used sea water. After the turbine unit 4, the discharged sea water is led to the dilution unit 7 mainly for pH control in order to guarantee that the discharged sea water meets prevailing environmental criteria.

On one hand, a sufficiently high pH is needed in the scrubber unit 1 in order to achieve the necessary sulphur ($SO_x$) scrubbing efficiency. This determines the amount of sea water that has to be pumped into the scrubber unit 1 for the scrubbing process. On the other hand, the environmental criteria applying to water discharged from a marine vessel into the surrounding sea set a stricter pH requirement for this discharged water. In practice this means that the scrubbing process can be carried out with less water, whereby it is sufficient to pump a smaller amount of sea water by the pump means 2 into the scrubbing unit 1.

In this way also the pumping energy requirement for the pump means 2 can be optimized as this provides a way to lessen the amount of required sea water for the actual scrubbing process taking place in the scrubber unit 1.

In order to guarantee compliance with said environmental criteria, the sea water discharged from the scrubbing unit 1 and subsequently led from the treatment unit 6 into the dilution unit 7 advantageously is mixed e.g. with fresh sea water in the dilution unit 7 for dilution purposes. This fresh sea water can be provided from the surrounding sea as indicated by feed pipe 23 or from the supply pipe 22 upstream of the pump means 2 as indicated by feed-back pipe 24, as appropriate. A separate pump can naturally be used for this purpose. Alternatively dilution water can also be provided e.g. from a central cooler of the combustion unit or other machinery on board the marine vessel 40. Clearly, it is to be understood that, if the sea water discharged from the scrubber unit 1 as such fulfils the prevailing environmental criteria, further dilution may not be necessary.

The pumping of water into the dilution unit 7 requires relatively less energy, since the lifting height for pumping water to the dilution unit 7 is far lower than the lifting height for pumping water into the scrubber unit 1, which is located high up in the structure of the marine vessel 40. This further increases the energy efficiency of the scrubbing process.

The sea water thus treated, and diluted, if necessary and as discussed above, can then be discharged into the surrounding sea through the outlet pipe 25.

FIG. 5 illustrates a fourth embodiment of the present invention. This embodiment corresponds to the embodiment discussed above in FIG. 4. The difference with regard to the embodiment of FIG. 4 is that discharged scrubbing medium is firstly led to the turbine unit 4 and thereafter to the treatment unit 6. After the treatment unit 6 discharged scrubbing medium is led to the dilution unit 7. Although the electric network 60 (FIG. 4) is not shown, it is clear that it can be deployed in connection with this embodiment in a corresponding manner as described above.

It is also possible that treatment in the treatment unit 6 as discussed in connection with the embodiments of FIG. 2 and FIG. 3 above is not necessary, e.g. due to a high scrubbing medium flow which renders the discharged scrubbing medium compliant with prevailing environmental criteria.

The description and thereto related drawings are only intended to clarify the basic idea of the present invention. The invention may vary in detail, such as to the number of pump means, scrubber units, turbine units, optional treatment units, optional dilution units, electric networks, generators, electric motors, etc., within the scope of the ensuing claims.

The invention claimed is:
1. A scrubber unit arrangement for a marine vessel for cleaning exhaust gas, which arrangement comprises:
 a scrubber unit for receiving a flow of exhaust gas;
 a pump for supplying a scrubbing medium to the scrubber unit from a source of scrubbing medium; and a discharge pipe for discharging scrubbing medium from the scrubber unit, the scrubber unit arrangement being arranged such that scrubbed exhaust gas is separately discharged from the scrubber unit arrangement, a turbine unit arranged to receive discharged scrubbing medium from the scrubber unit in order to capture the hydrostatic energy of the downwards flow of the fluid scrubbing medium.

2. The arrangement according to claim 1, wherein the pump-means is arranged independently of the turbine unit, the pump is provided with an electric motor, and the turbine unit is provided with a generator.

3. The arrangement according to claim 1, wherein the turbine unit is mechanically connected to the pump.

4. The arrangement according to claim 3, wherein an electric motor is connected to the pump.

5. The arrangement according to claim 3, wherein a combined electric motor and generator is connected to the pump.

6. The arrangement according to claim 1, wherein the arrangement further comprises a treatment unit for treating discharged scrubbing medium, which treatment unit is arranged downstream of the scrubber unit in a flow direction of the scrubbing medium.

7. The arrangement according to claim 6, wherein the treatment unit is located upstream of the turbine unit in the flow direction of the scrubbing medium.

8. The arrangement according to claim 6, wherein the treatment unit is located downstream of the turbine unit in the flow direction of the scrubbing medium.

9. The arrangement according to claim 1, wherein the arrangement further comprises a dilution unit for pH control, and the dilution unit is arranged to receive discharged scrubbing medium.

10. The arrangement according to claim 9, wherein the arrangement is provided with means for providing a dilution medium to the dilution unit.

11. The arrangement according to claim 1, wherein the scrubbing medium is sea water.

12. The arrangement according to claim 1, wherein the arrangement is deployed on a marine vessel.

* * * * *